(12) United States Patent
Raith et al.

(10) Patent No.: US 6,496,489 B1
(45) Date of Patent: *Dec. 17, 2002

(54) METHOD AND APPARATUS FOR DISTINGUISHING BETWEEN A DIGITAL CONTROL CHANNEL AND A DIGITAL TRAFFIC CHANNEL IN A RADIOCOMMUNICATION SYSTEM

(75) Inventors: Alex Krister Raith, Durham, NC (US); Francois Sawyer, St-Hubert (CA); Ray Henry, Raleigh, NC (US)

(73) Assignee: Telefonaktiebolaget LM Ericsson, Stockholm (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/357,158
(22) Filed: Jul. 19, 1999

Related U.S. Application Data

(60) Division of application No. 08/481,865, filed on Jun. 7, 1995, now Pat. No. 5,970,057, which is a division of application No. 08/331,711, filed on Oct. 31, 1994, now Pat. No. 6,058,108, which is a continuation-in-part of application No. 08/147,254, filed on Nov. 1, 1993, now Pat. No. 5,603,081.

(51) Int. Cl.[7] .................................................. H04Q 7/00
(52) U.S. Cl. ........................ 370/328; 370/331; 375/341; 375/262; 714/787; 714/762
(58) Field of Search ............................... 370/207, 320, 370/335, 342, 441, 328, 331; 375/200, 206, 259–265, 341, 342, 340; 348/384–395, 400, 404; 714/787, 762

(56) References Cited

U.S. PATENT DOCUMENTS

| | | | | |
|---|---|---|---|---|
| 5,243,419 A | * | 9/1993 | Faryar et al. | 358/133 |
| 5,287,374 A | * | 2/1994 | Parr | 375/341 |
| 5,361,096 A | * | 11/1994 | Ohki et al. | 348/387 |
| 5,416,797 A | * | 5/1995 | Gilhousen et al. | 375/130 |
| 5,442,625 A | * | 8/1995 | Gitlin et al. | 375/205 |
| 5,509,020 A | * | 4/1996 | Iwakiri et al. | 375/341 |
| 5,546,420 A | * | 8/1996 | Seshadri et al. | 375/200 |
| 5,751,739 A | * | 5/1998 | Seshadri et al. | 371/30 |

* cited by examiner

*Primary Examiner*—Ajit Patel
(74) *Attorney, Agent, or Firm*—Myers Bigel Sibley & Sajovec

(57) ABSTRACT

A method and system for locating control channels, particularly digital control channels, are described. By grouping the channels which are candidates for carrying supervisory messages in blocks indicative of their relative likelihood for being used as control channels, a mobile station can begin its search for a control channel with channels which are most likely to actually be control channels. Placing location information on other channels allows the mobile station to be redirected to a control channel when it reads one of these other channels. Similarly, by placing information describing the location of a control channel in a message associated with handoff, a mobile station avoids the necessity of having to relocate a new control channel associated with the base station to which the mobile has been handed off.

17 Claims, 8 Drawing Sheets

| Channel Numbers | Relative Probability |
|---|---|
| 1-26 | 1 |
| 27-52 | 2 |
| 53-78 | 3 |
| 79-104 | 4 |
| 105-130 | 5 |
| 131-156 | 6 |
| 157-182 | 7 |
| 183-208 | 8 |
| 209-234 | 9 |
| 235-260 | 10 |
| 261-286 | 11 |
| 287-312 | 12 |
| 313-333 | 16 |
| 667-691 | 13 |
| 692-716 | 14 |
| 991-1023 | 15 |

FIG. 1A

| Channel Numbers | Relative Probability |
|---|---|
| 334-354 | 16 |
| 355-380 | 1 |
| 381-406 | 2 |
| 407-432 | 3 |
| 433-458 | 4 |
| 459-484 | 5 |
| 485-510 | 6 |
| 511-536 | 7 |
| 537-562 | 8 |
| 563-588 | 9 |
| 589-614 | 10 |
| 615-640 | 11 |
| 641-666 | 12 |
| 717-741 | 13 |
| 742-766 | 14 |
| 767-799 | 15 |

FIG. 1B

| Block Number | Channel Number | Band | Number of Channels | Relative Probability |
|---|---|---|---|---|
| 1 | 1-26 | A | 26 | 4 |
| 2 | 27-52 | A | 26 | 5 |
| 3 | 53-78 | A | 26 | 6 |
| 4 | 79-104 | A | 26 | 7 |
| 5 | 105-130 | A | 26 | 8 |
| 6 | 131-156 | A | 26 | 9 |
| 7 | 157-182 | A | 26 | 10 |
| 8 | 183-208 | A | 26 | 11 |
| 9 | 209-234 | A | 26 | 12 |
| 10 | 235-260 | A | 26 | 13 |
| 11 | 261-286 | A | 26 | 14 |
| 12 | 287-312 | A | 26 | 15 |
| 13 | 313-333 | A | 21 | 16 (Lowest) |
|  |  |  |  |  |
| 14 | 667-691 | A' | 25 | 3 |
| 15 | 692-716 | A' | 25 | 2 |
|  |  |  |  |  |
| 16 | 991-1023 | A'' | 33 | 1 (Highest) |

FIG. 1C

| Block Number | Channel Number | Band | Number of Channels | Relative Probability |
|---|---|---|---|---|
| 1 | 334-354 | B | 21 | 16 (Lowest) |
| 2 | 355-380 | B | 26 | 15 |
| 3 | 381-406 | B | 26 | 14 |
| 4 | 407-432 | B | 26 | 13 |
| 5 | 433-458 | B | 26 | 12 |
| 6 | 459-484 | B | 26 | 11 |
| 7 | 485-510 | B | 26 | 10 |
| 8 | 511-536 | B | 26 | 9 |
| 9 | 537-562 | B | 26 | 8 |
| 10 | 563-588 | B | 26 | 7 |
| 11 | 589-614 | B | 26 | 6 |
| 12 | 615-640 | B | 26 | 5 |
| 13 | 641-666 | B | 26 | 4 |
| | | | | |
| 14 | 717-741 | B' | 25 | 3 |
| 15 | 742-766 | B' | 25 | 2 |
| 16 | 767-799 | B' | 33 | 1 (Highest) |

FIG. 1D

| Information Element | Type | Length (bits) |
|---|---|---|
| Protocol Discriminator | M | 2 |
| Message Type | M | 8 |
| Ack Message Type | M | 8 |
| Remaining Length | M | 6 |
| Last Decoded Parameter | O | 14 |
| DCC Information | O | 29 |

FIG. 4A

| Field | Length (bits) |
|---|---|
| Parameter Type (DCC Information) | 4 |
| Number of Values | 6 |
| Channels | 11 |
| DVCC | 8 |

FIG. 4B

METHOD AND APPARATUS FOR DISTINGUISHING BETWEEN A DIGITAL CONTROL CHANNEL AND A DIGITAL TRAFFIC CHANNEL IN A RADIOCOMMUNICATION SYSTEM

RELATED APPLICATION

This application is a divisional, of application Ser. No. 08/481,865, filed Jun. 7. 1995 U.S. Pat. No. 5,970,057; which is a Divisional of U.S. patent application Ser. No. 08/331,711 filed Oct. 31, 1994 U.S. Pat. No. 6,058,108; which is a Continuation-in-Part of U.S. patent application Ser. No. 08/147,254, filed Nov. 1, 1993, which is now U.S. Pat. No. 5,603,081, which disclosure is incorporated here by reference.

BACKGROUND

The present invention relates generally to radiocommunication systems having control channels and, more particularly, to the location of digital control channels in such systems.

Radiocommunication systems have traditionally been analog in nature. The rapid growth of radiocommunication systems, however, has compelled system designers to search for ways in which system capacity can be increased without reducing communication quality beyond consumer tolerance thresholds. One way in which increased capacity can be provided is by changing from analog to digital communication techniques. In North America, this change was implemented by transitioning from the analog AMPS system to a digital system (D-AMPS) which is now standardized as IS-54B.

Since a large consumer base having equipment that operated only in the analog domain existed prior to the introduction of digital techniques, a dual-mode (analog and digital) standard was adopted in IS-54B so that analog compatibility was provided in tandem with digital communication capability. For example, the IS-54B standard provides for both analog and digital traffic channels, wherein the system operator can replace analog traffic channels with digital traffic channels, and vice-versa, in a dynamic manner to accommodate fluctuating traffic patterns among analog and digital users.

In addition to traffic channels, radiocommunication systems also provide control channels which are used to carry call setup data messages between base stations and mobile stations. According to IS-54B, for example, there are 21 dedicated analog control channels which are assigned to fixed frequencies for each of the A and B carriers. These analog control channels are termed "dedicated" since they are always found at the same frequency and, therefore, can be readily located by the mobile stations which need to monitor the data which is transmitted thereon.

For example, when in the idle state (i.e., turned on but not in use), a mobile station in an IS-54B system tunes to and then continuously monitors the strongest control channel at its known frequency (generally, the control channel of the cell in which the mobile station is located at that moment) and may receive or initiate a telephone call through the corresponding base station. When moving between cells while in the idle state, the mobile station will eventually "lose" radio connection on the control channel of the "old" cell and tune to the control channel of the "new" cell. The initial tuning to, and the change of, control channel are both accomplished automatically by scanning all the control channels at their known frequencies in operation in the cellular system to find the "best" control channel. When a control channel with good reception quality is found, the mobile station remains tuned to this channel until the quality deteriorates again. In this manner, all mobile stations are nearly always "in touch" with the system.

As such hybrid systems mature, it is anticipated that the number of analog users will diminish and the number of digital users will increase. Eventually all of the analog traffic channels will probably be replaced by digital traffic channels. When that occurs, less expensive digital-only mobile units can replace the current dual-mode units. However, such digital-only mobile units would be unable to scan the analog control channels currently provided in the IS-54B system.

Accordingly, it is desirable to provide digital control channels to radiocommunication systems which support digital technology, such as that described by IS-54B. In addition to compatibility issues, digital control channels are also desirable for other reasons described in the above-identified application, for example an enhanced sleep mode for mobile units which results in longer battery life. Whereas IS-54B provides dedicated control channels, more flexibility is desirable in assigning the number of control channels and the frequencies for these control channels to optimize system capacity and to support hierarchical cell structures, i.e., microcells, picocells, etc. If, however, the digital control channels are not located on known frequencies, the question arises as to how the remote units will be able to locate these control channels for monitoring.

One conventional radiocommunication system used in Europe, known as the GSM, is already an all-digital system. In this system, the mobile unit simply scans through all of the available channels until it identifies a digital control channel. This location technique, however, is too slow for systems having a large number of channels. Moreover, the problem of locating a digital control channel after call termination is exacerbated by handoffs of mobile units that move from cell to cell, since a mobile unit cannot then even use its knowledge of the location of the control channel which it had been monitoring prior to the call.

SUMMARY

These and other drawbacks and limitations of conventional systems and methods are overcome according to the present invention wherein digital control channel location is expedited by, for example, prescribing a search pattern based on a relative likelihood of finding a digital control channel on a particular channel or group of channels and providing digital control channel location information on other channels.

According to exemplary embodiments of the present invention, channels are grouped into probability blocks which are ranked in accordance with the relative likelihood of finding the digital control channel in each block. A mobile unit can then look for a digital control channel within a highest ranked probability block, followed by a second highest ranked probability block and so on, until a digital control channel is located.

According to other exemplary embodiments of the present invention, information can be provided on other channels, such as traffic channels or analog control channels, which points the mobile station to a particular channel on which a digital control channel can be found or a group of channels within which a digital control channel can be found. In this way, the location process is expedited when compared with sequential channel searching.

According to still further exemplary embodiments of the present invention, a mobile unit can receive information about digital control channel location during call termination. In this way, the mobile unit need not repeat the process of trying to determine where a digital control channel is located immediately after call termination, which is particularly useful in situations where the mobile moved to a new cell during the call.

BRIEF DESCRIPTION OF THE DRAWINGS

The foregoing, and other, objects, features and advantages of the present invention will be more readily understood upon reading the following detailed description in conjunction with the drawings in which:

FIGS. 1(a)–1(d) are tables which show exemplary probability block schemes according to the present invention;

FIG. 4(a) is a table which illustrates an exemplary message format according to the present invention;

FIG. 4(b) is a table which illustrates an entry of the table of FIG. 4(a) in more detail.

DETAILED DESCRIPTION

Figure 2A:
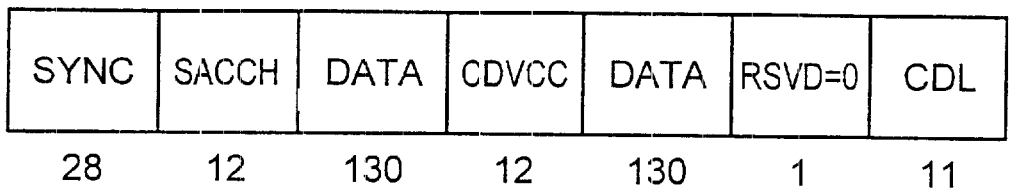
FIG. 2(a) illustrates an exemplary downlink digital traffic channel according to the present invention.

According to exemplary embodiments of the present invention, several techniques can be used, either together or individually, to expedite the acquisition of a digital control channel by the mobile station.

One technique which can be used to aid the mobile in searching for a digital control channel is to group the available frequencies into blocks which are assigned different probabilities that reflect the relative likelihood of finding a digital control channel in each block. In this manner, the time required for service acquisition by the mobile station may be significantly decreased. The two tables depicted in FIGS. 1(a) and 1(b) are examples of how the channels in the A-Band and B-Band, respectively, can be assigned different relative probabilities for supporting digital control channel acquisition. Similarly, FIGS. 1(c) and 1(d) present another such example. This technique can be used by a mobile station as a starting point for digital control channel location, for example, before it has received any digital control channel locator information (described below). Once a mobile station has received digital control channel locator information, it can use this information in lieu of the channel block probability scheme described herein.

Another technique for aiding the mobile in its search for a digital control channel is to place digital control channel location information on channels other than the digital control channel so that if the mobile reads such a channel while searching for the DCC, its search can be expedited. For example, the digital control channel locator (DL) is a parameter which can be placed on the digital traffic channel and that provides information to assist a mobile station in finding a digital control channel. The DL identifies for the mobile station the RF channel which carries a digital control channel. Depending upon the number of bits available to express the DL and the number of channels in the system, the DL may uniquely identify the channel on which a digital control channel resides or it may narrow the search to some subset of the possible channels. For example, if a 7-bit DL is provided, then DL values 1, 2, 3 . . . 127 would be mapped to channel numbers 1–8, 9–16, 17–24, . . . 1009–1016, respectively. Thus, for example, if a digital control channel occupies channel number 10, then a DL value of 2 would be sent on the digital traffic channels in the same cell. The DL value of zero does not provide any digital control channel location information, but instead indicates that no DL information is being provided by the system.

Once DL values are determined, they are encoded to form the CDL which is sent on the digital traffic channel in, for example, bit positions 314 to 324 in a TDMA slot. This is illustrated by the exemplary digital traffic channel base-to-mobile slot format shown in FIG. 2(a). The numbers below the data fields indicate the number of bits therein. Fields other than the CDL are those found in conventional IS-54B base-to-mobile traffic channel slots and the interested reader is referred thereto for additional information. Exemplary uplink digital traffic channel, uplink digital control channel, and downlink digital control channel slot formats are illustrated as FIGS. 2(b), 2(c) and 2(d), respectively, for reference and later discussion. Those skilled in the art will appreciate that other bit positions can be used for the CDL field in the slot, however, this particular position is advantageous in that it corresponds to the previously unused RSVD field of the downlink digital traffic channel slots of IS-54B. In this way, changes to the IS-54B air interface are minimized. These RSVD bits are defaulted to zeros in the IS-54B specification, which conveniently indicates when no location information has been provided. Another possibility would be to provide the DL into the Layer 2 frame of the DTC.

According to exemplary embodiments of the present invention, all channel numbers are valid candidates for digital control channel assignment. Considering that the DL does not necessarily uniquely identify any particular channel number, it is desirable that a priority scheme be established which can be used to search for digital control channel within each channel block identified by the DL. A mobile station receiving the DL value associated with a particular channel block will not automatically search all channels, but will instead search for a digital control channel in this block in accordance with this priority scheme. Thus, for example, for a DL value of 1, a mobile station could examine channel numbers 8 through 1 starting with channel 8 then 7, etc., in an attempt to find the digital control channel.

Figure 3:
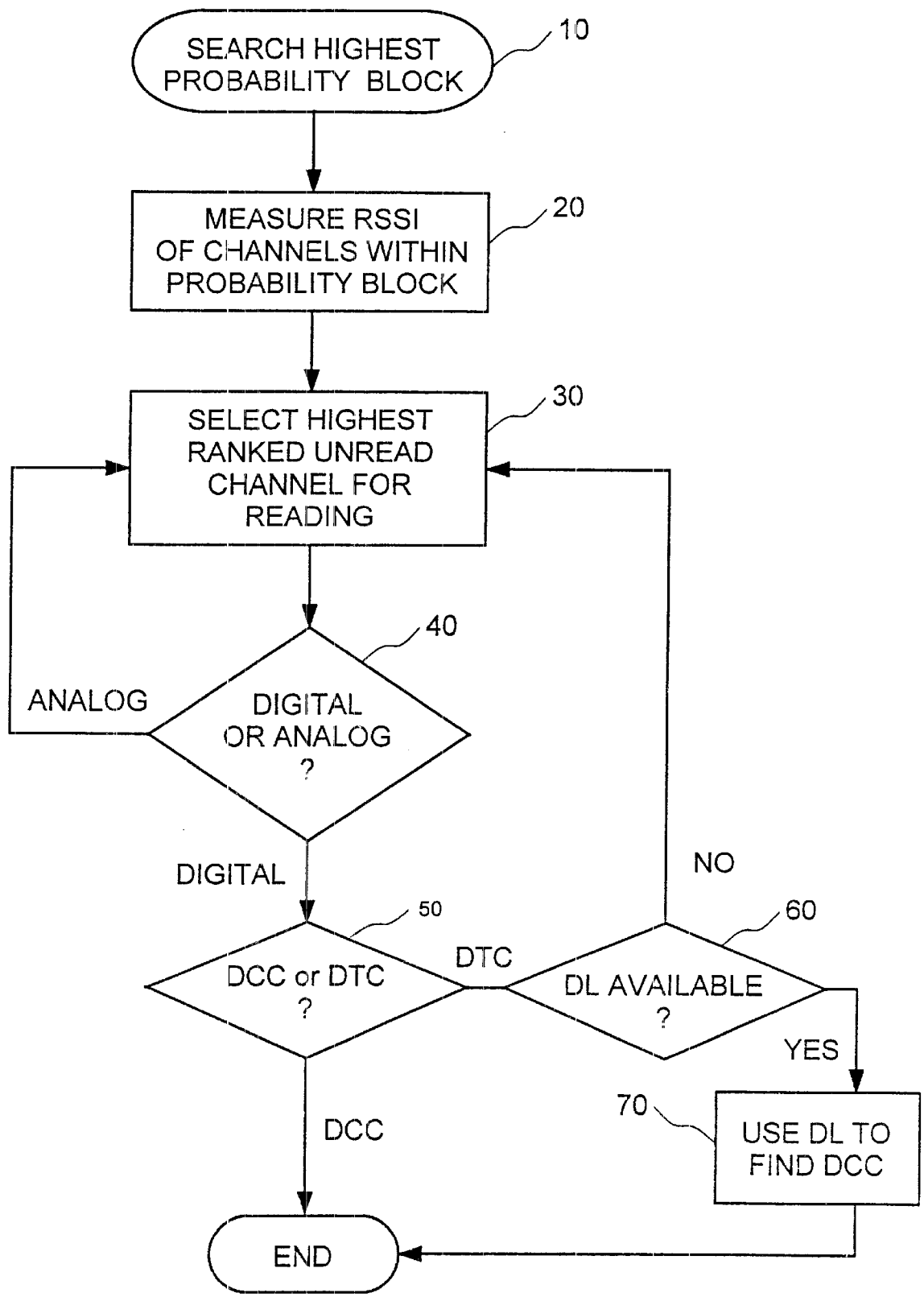
FIG. 3 is a flow chart which depicts an exemplary method for locating a digital control channel according to the present invention.

Having described exemplary techniques which can be used to expedite the location of a digital control channel, other exemplary embodiments of the present invention will now be described wherein these techniques are applied in various situations. For example, and with reference to the flow chart of FIG. 3, suppose that a mobile station is seeking a digital control channel on the A-Band carrier of an IS-54 system. As shown at block 10, the mobile will first examine, assuming that no other information is available in the mobile station, the channels within the highest ranked probability block, for example, block 1 having channel numbers 1–26 in FIG. 1(a). Within this block of channels, the mobile will select a first channel to read based on some predetermined criteria. For example, as described in block 20, this criteria can be the measured signal strength of the channels within the probability block. Alternately, the channels could be read in numbered order within the block. Thus, the mobile measures the signal strength (RSSI) of channels 1–26 and ranks them in order from strongest to weakest. The highest signal strength channel, denoted channel 'X' for this discussion, is then selected for reading at block 30. If this selected channel 'X' is identified as an analog channel at block 40, i.e., either an analog control channel or an analog traffic channel, then the flow returns to block 30 where the next highest ranked channel is selected for reading. If, on the other hand, channel 'X' is a digital channel, then the flow proceeds to decision block 50 wherein the digital channel is identified as being either a control channel or a traffic channel. This identification can be performed in a variety of ways.

Figure 2B:
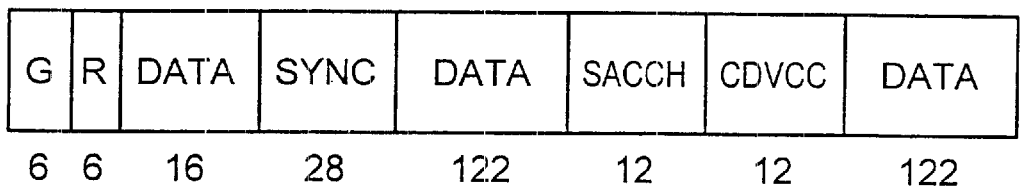
FIG. 2(b) illustrates a conventional uplink digital traffic channel.
Figure 2C:
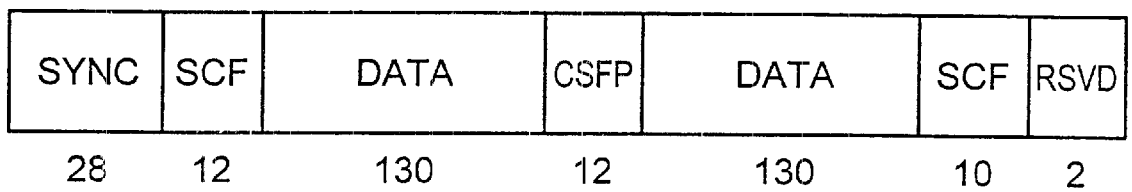
FIG. 2(c) illustrates an exemplary uplink digital control channel slot format according to the present invention.
Figure 2D:
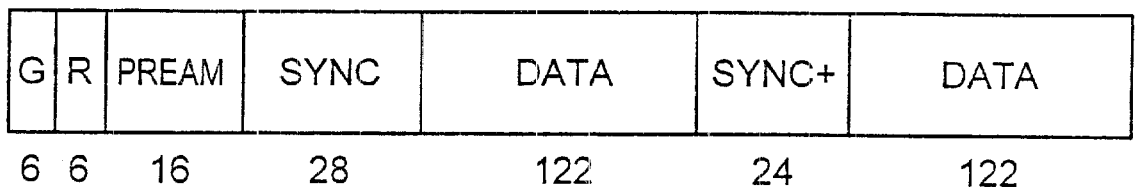
FIG. 2(d) illustrates an exemplary downlink digital control channel slot format according to the present invention.

As an example for distinguishing between a digital traffic channel and a digital control channel, the IS-54standard will again be used as an illustrative reference. Although the IS-54B digital traffic channel and digital control channel downlink slot format have structural commonality, as seen in FIGS. 2(a) and 2(c), there are also certain differences which allow for distinguishing a digital control channel from a digital traffic channel. First, because of the differences in the channel coding of the digital verification color code (DVCC) and superframe (SFP) fields, there are always 4 bits out of 12 which are different in every pair of CDVCC and CSFP codewords regardless of which CDVCC or CSFP codeword is transmitted by a base station (bit errors introduced due to radio channel impairments, however, may change the extent to which transmitted codewords differ once they are received by a mobile station). More specifically, the four check bits of the SCFP are inverted relative to the check bits of the CDVCC. Secondly, the CDVCC content is fixed from slot to slot on a digital traffic channel whereas the content of the CSFP changes in a predictable fashion from slot to slot on a digital control channel.

Another distinction which could be used is that the channel coding and interleaving employed on a digital traffic channel is different from that employed on a digital control channel regardless of the DTC service (speech or FACCH). For example, the digital traffic channel might use ½ rate coding while the digital control channel uses ¼ rate coding. Moreover, the IS-54B SACCH and RESERVED fields have different functionality on a digital control channel. The actual function of each of the fields illustrated in FIGS. 2(a)–2(d) is not germane to the present discussion, however, for a more detailed explanation of the functionality of these fields reference is made to the above-incorporated application.

If channel 'X' is a digital control channel then the location process has accomplished its goal and the flow proceeds to the END block. If, on the other hand, channel 'X' is a digital traffic channel, then the process moves to block 60 wherein it is determined whether or not the digital traffic channel includes digital control channel location information, such as the aforedescribed DL field. If not, then the mobile reads another channel and the flow moves back to block 30. If so, then this information is used to find the digital control channel at block 70.

As an alternative to the foregoing probability block scheme, in hybrid systems where analog control channels still exist, such as the IS-54B, digital location information can be placed on these channels. For example, digital control channel information can be placed on each of the 21 dedicated analog control channels found on both carriers in IS-54B. Then, a mobile station can first tune to the strongest available analog control channel, determine where the digital control channel for that cell is located, and then tune directly to the digital control channel.

According to another exemplary embodiment of the present invention, information regarding digital control channel location can also be provided to a mobile station when that mobile station undergoes a call termination. One of the messages which is typically sent from a base station to a mobile station in connection with the termination of a call is a RELEASE message which informs the mobile search for a DCC on an indicated frequency. By placing information regarding the location of a digital control channel associated with the cell in which the mobile station is located at the time of call termination on the RELEASE message, the mobile station need not then go through any procedures for locating a new digital control channel. In this way, the mobile station will have knowledge of digital control channel location regardless of whether it has been handed off or not during a previous connection.

As an example, FIGS. 4(a) and 4(b) illustrate message formats by which information can be provided to a mobile station in the RELEASE message for finding a digital control channel. FIG. 4(a) shows an overview of an exemplary RELEASE message format which includes a Type o (optional) DCC information field having 29 bits. An exemplary format for these 29 bits is illustrated in FIG. 4(b). Therein, the "Parameter Type" field identifies the field as a DCC information field. The "Number of Values" field indicates how many information elements are in the message. The "Channel" field identifies the frequency on which a control channel can be found and the "DVCC field" provides digital verification color code information. Of course those skilled in the art will appreciate that the foregoing signal format is only an exemplary, illustrative manner in which digital control channel location information can be provided and that other formats can be used.

Figure 5:
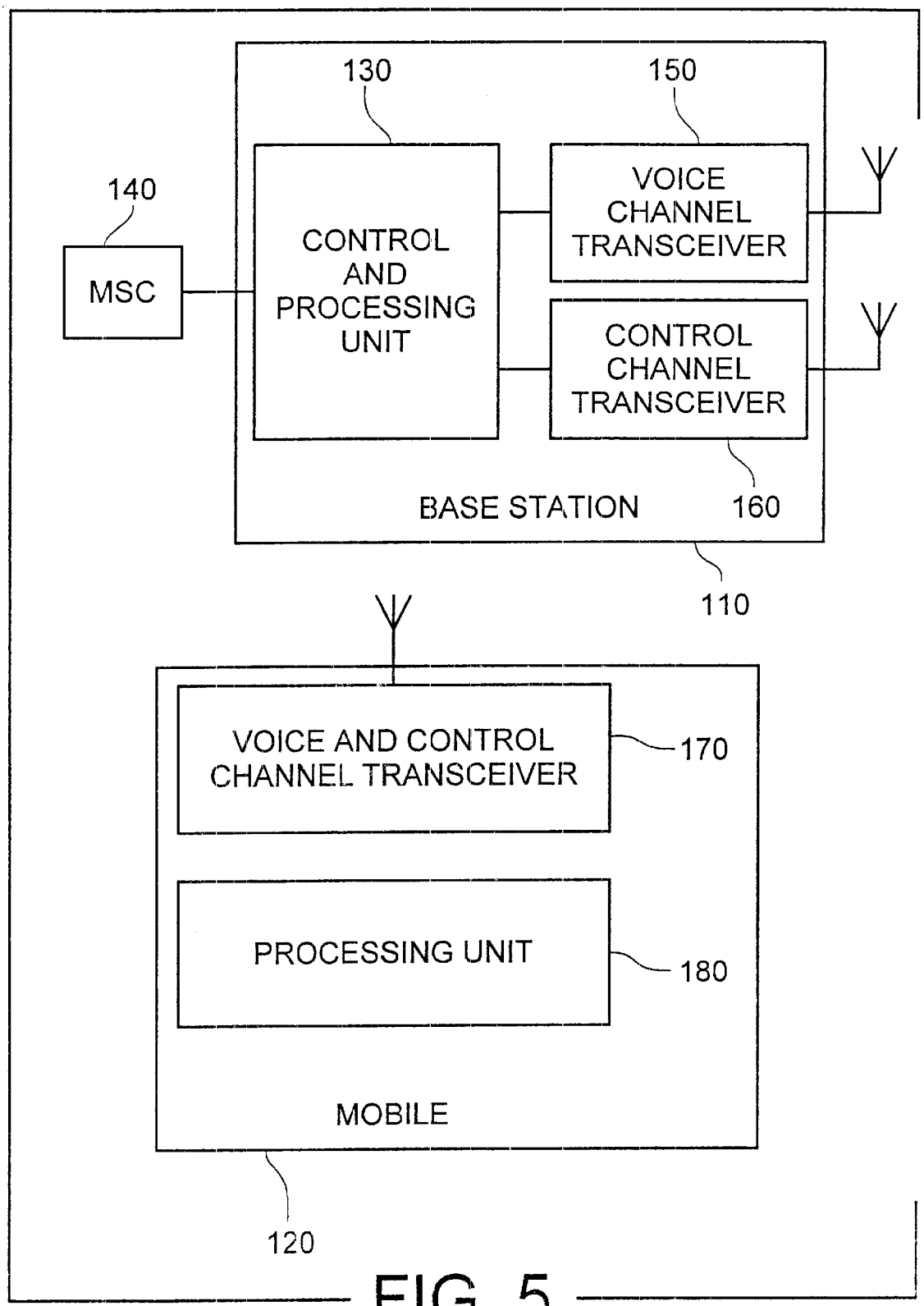
FIG. 5 is a block diagram of an exemplary radio communication system according to the present invention.
Figure 6A:
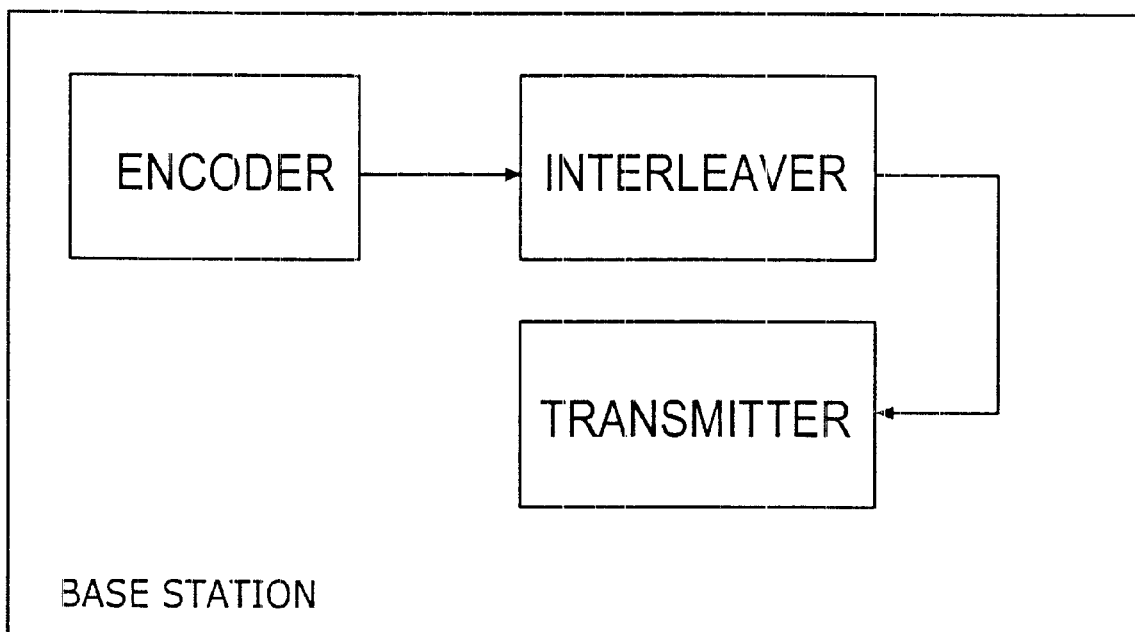
FIGS. 6A illustrates a base station with an encoder, an interleaver and a transmitter, and 6B illustrates a mobile station with receiving means, deinterleaving means, decoding means and a processor.
Figure 6B:
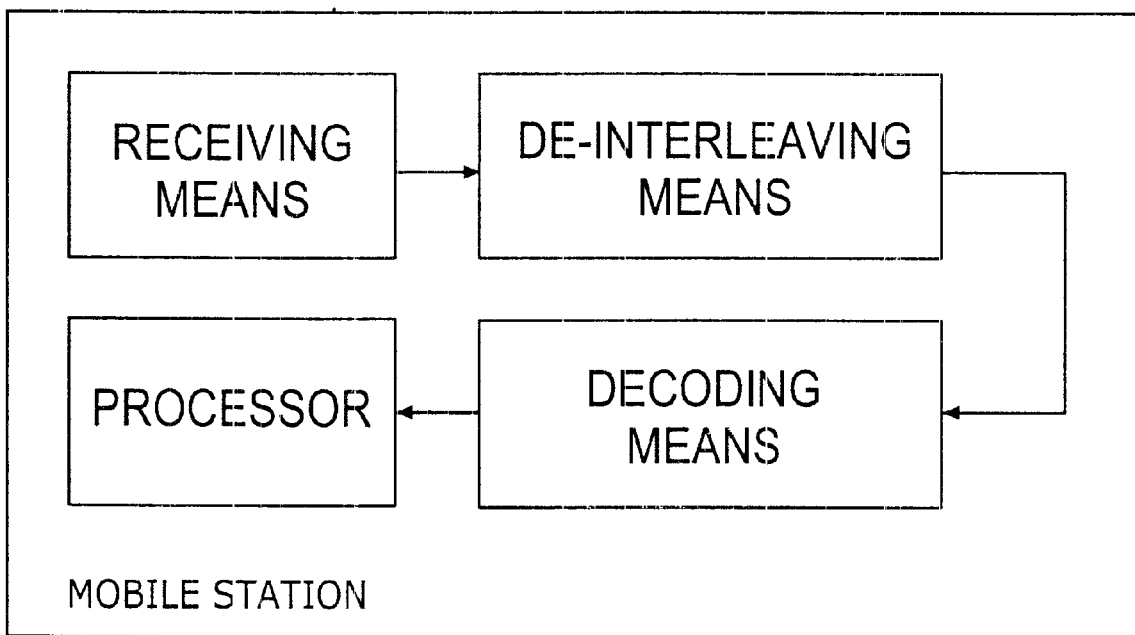

FIG. 5 represents a block diagram of an exemplary cellular mobile radiotelephone system according to one embodiment of the present invention which can be used to implement the foregoing. The system shows an exemplary base station 110 and a mobile 120. The base station includes a control and processing unit 130 which is connected to the MSC 140 which in turn is connected to the public switched telephone network (not shown).

The base station 110 for a cell includes a plurality of voice channels handled by voice channel transceiver 150 which is controlled by the control and processing unit 130. Also, each base station includes a control channel transceiver 160 which may be capable of handling more than one control channel. The control channel transceiver 160 is controlled by the control and processing unit 130. The control channel transceiver 160 broadcasts control information over the control channel of the base station or cell to mobiles locked to that control channel. The voice channel transceiver 150 handles the traffic or voice channels which can include digital control channel location information as described previously.

When the mobile 120 first enters the idle mode, it periodically scans the control channels of base stations like base station 110 to determine which cell to lock on or camp to. The mobile 120 receives the absolute and relative information broadcasted on a control channel at its voice and control channel transceiver 170. Then, the processing unit 180 evaluates the received control channel information which includes the characteristics of the candidate cells and determines which cell the mobile should lock to. The received control channel information not only includes absolute information concerning the cell with which it is associated, but also contains relative information concerning other cells proximate to the cell with which the control channel is associated. These adjacent cells are periodically scanned while monitoring the primary control channel to determine if there is a more suitable candidate. Additional information relating to specifics of mobile and base station implementations can be found in copending U.S. patent application Ser. No. 07/967,027 entitled "Multi-Mode Signal Processing" filed on Oct. 27, 1992 to P. Dent and B. Ekelund, which disclosure is incorporated here by reference.

The above-described exemplary embodiments are intended to be illustrative in all respects, rather than restrictive, of the present invention. Although the foregoing exemplary embodiments have been described in terms of base and mobile stations, the present invention can be applied to any radiocommunication system. For example, satellites could transmit and receive data in communication with remote devices, including portable units, PCS devices, personal digital assistants, etc.

Thus the present invention is capable of many variations in detailed implementation that can be derived from the description contained herein by a person skilled in the art. All such variations and modifications are considered to be within the scope and spirit of the present invention as defined by the following claims.

What is claimed is:

1. A base station comprising:
an interleaver for interleaving digital traffic channels according to a first interleaving format and digital control channels according to a second interleaving format;
an encoder for encoding digital traffic channels according to a first channel coding format and digital control channels according to a second channel coding format, wherein said first and second channel coding formats are different and/or said first and second interleaving formats are different; and
a transmitter for broadcasting said digital traffic channels and digital control channels.

2. A mobile station comprising:
means for receiving a channel signal broadcast over an air interface;
means for de-interleaving the received channel signal and determining an interleaving format according to which the received channel signal was interleaved;
means for decoding the received channel signal and determining a channel coding format according to which said received channel signal was encoded; and
a processor for identifying said received channel signal as a control channel or as a traffic channel based on at least one of the interleaving format and channel coding format.

3. The mobile station of claim 2, wherein said channel coding format is ¼-rate or ½-rate coding.

4. The base station of claim 1, wherein said digital control channels carry call setup data messages.

5. The base station of claim 1, wherein said digital traffic channels include information associated with the location of said digital control channels.

6. The base station of claim 1, wherein said digital traffic channels and said digital control channels are broadcast on different frequencies.

7. The mobile station of claim 2, wherein said control channel carries call setup data messages.

8. The mobile station of claim 2, wherein said traffic channel includes information associated with locating said control channel.

9. The base station of claim 1, wherein said first channel coding format is ¼-rate coding and said second channel coding format is ½-rate coding.

10. A method for locating digital control data, comprising the steps of:
receiving a data frame;
de-interleaving the received data frame;
decoding the de-interleaved received data frame; and
locating digital control data in the data frame based on results of the decoding step.

11. The method of claim 10, wherein at least a portion of the data frame is decoded according to a first coding format and a second coding format.

12. The method of claim 11, wherein the first coding format is associated with digital traffic data and the second coding format is associated with digital control data.

13. A mobile station, comprising:
means for receiving a data frame;
means for de-interleaving the data frame;
means for decoding the de-interleaved received data frame; and
means for locating digital control data in the data frame based on results of the decoding.

14. The mobile station of claim 13, wherein the decoding means decodes the de-interleaved received data frame according to a first coding format and a second coding format.

15. The mobile station of claim 14, wherein the first coding format is associated with digital traffic data and the second coding format is associated with digital control data.

16. The mobile station of claim 13, wherein the de-interleaving means de-interleaves the data frame according to a first interleaving format and a second interleaving format.

17. The mobile station of claim 16, wherein the first interleaving format is associated with digital traffic data and the second interleaving format is associated with digital control data.

* * * * *